United States Patent Office 2,867,480
Patented Jan. 6, 1959

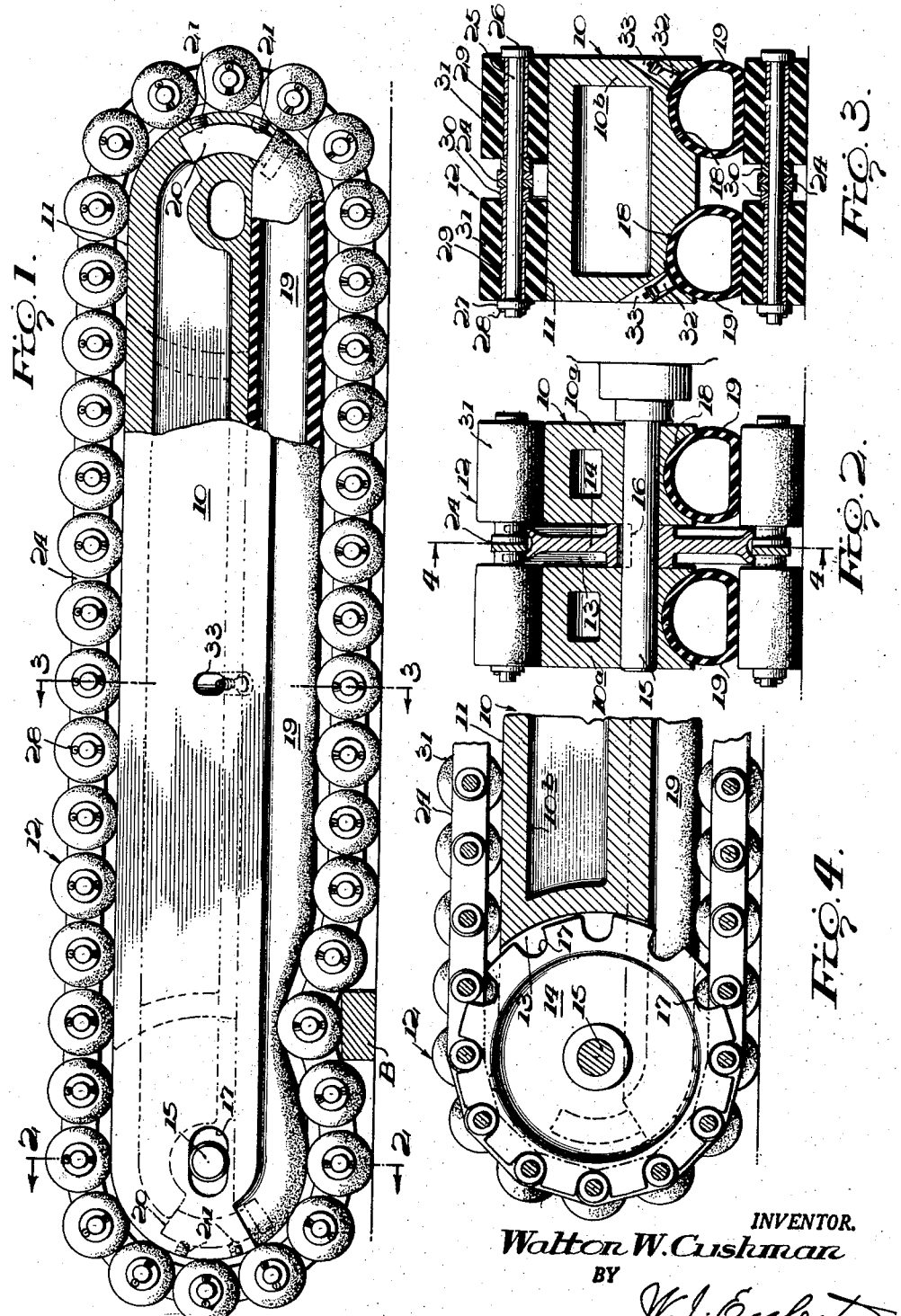

2,867,480
ENDLESS TREAD AND TRACK ASSEMBLY

Walton W. Cushman, Webb City, Mo.

Application October 31, 1957, Serial No. 693,789

3 Claims. (Cl. 305—10)

(Granted under Title 35, U. S. Code (1952), sec. 266)

The invention described herein, if patented, may be manufactured and used by or for the Government for governmental purposes, without the payment to me of any royalty thereon.

My invention relates to an endless tread and track assembly for use with tractors and industrial lift trucks in which the tread members themselves are formed from non-metallic material, such as rubber, synthetic rubber, or the like.

A principal object of the invention is to provide an improved tractor endless tread which provides excellent traction and a cushioned ride over extremely rough terrain, as well as superior performance in deep mud.

Another object is to provide means permitting the cushioning qualities to be varied as desired and also means for varying the tension on the endless tread; it being another object to provide a frame member having trackways for the non-metallic endless tread which provide a rigid or solid, unyielding support for the tread during its upper flight of travel and a yieldable, cushioned, or flexible support for said tread during its lower, or ground-engaging flight of travel.

A further object is to provide an assembly as aforesaid which is of sturdy and rugged construction, relatively inexpensive to produce, efficient in operation, and one which may be employed with various types and sizes of tractors.

The foregoing and other objects and advantages of the present invention will be apparent from the following description and appended claims when considered in conjunction with the accompanying drawing forming a part of this specification wherein like reference characters designate corresponding parts in the several views, and in which Fig. 1 is a longitudinal elevation, partly broken away and partly in section, of a preferred form of my endless tread and track assembly;

Fig. 2 is a vertical section taken substantially along the line 2—2 of Fig. 1, looking in the direction of the arrows;

Fig. 3 is a vertical section taken substantially along the line 3—3 of Fig. 1, in the direction of the arrows; and Fig. 4 is a fragmentary vertical sectional view, taken substantially along the line 4—4 of Fig. 2, looking in the direction of the arrows.

Referring now particularly to the drawing, the so-called endless tread and track assembly is used, as shown, with a frame or supporting means, shown as a whole at 10. It is formed from steel or other suitable metal and provides at its top a flat, even, uninterrupted track surface or base 11 which supports the top flight of the endless tread, shown as a whole at 12. The frame or support 10 is preferably a casting, notched or divided vertically at its opposite ends at 13 to provide spaces to receive sprockets 14, only one such being shown in the drawing. Thus, as shown, the end portions of the casting 10 are in two halves or sections 10a, 10a, see Fig. 2. The intermediate portion of the casting 10, between the divided ends, is one undivided whole, see Fig. 3 and compare Figs. 2 and 3, this intermediate portion being designated 10b.

Each sprocket 14 is mounted on a shaft 15 (one such being shown) and keyed thereto at 16. The shaft 15 passes thru slots 14 and is journalled in a bore formed in the twin halves or sections 10a, 10a. The sprocket 14 is peripherally notched at 17 for a purpose to be described.

The bottom or undersurface, or face of the frame or support 10, 10a, is provided with two spaced, substantially parallel, longitudinal concave depressions, recesses, or grooves 18, 18. These grooves extend from end to end of the frame, or support 10, 10a. It is conceivable, of course, that a single groove 18 may be used instead of the two, as shown.

Each groove 18 has seated therein an elongated inflatable tube 19. Embedded in the end of each tube 19, as by molding, is the head end of a metal anchoring member 20 which is curved upwardly and inwardly with relation to the end section 10a and fits snugly in a space in the metal casting, being held in place by two or more threaded studs 21, Fig. 1.

The tubes 19, 19 are preferably made from rubber, rubber composition, synthetic rubber, or the like and when applied to the grooves are stretched to fill the grooves throughout their length, being held in place by the anchoring means or members 20 and 21. If desired, these tubes 19 may also be bonded to the metal of the grooves 18. These tubes are preferably normally round in cross section but are deformable in use. Thus, the top portion of frame 10, 10a is metallic, with its top face providing a smooth track or tracks. The bottom or under portion of the frame assembly is, however, compressible and presents two deformable spaced track portions for the lower flight travel of the endless tread as explained below.

The tread member or assembly 12 of my invention, as shown, comprises an endless chain 24 formed from a series of interconnected links, carrying, at closely spaced intervals, transverse shafts 25 each having an enlarged head 26 and carrying at its opposite end, a washer 27 and a cotter pin 28. A pair of spaced sleeves 29, 29 is telescoped over each shaft or axle 25 at opposite sides of chain 24 and they are held out of contact with chain 24 by spacer members 30.

The actual tread members are in the form of a series of non-metallic rollers 31, there being a pair of such rollers carried by each shaft 25 and pair of sleeves 29. One such complete unit is well shown in section in Fig. 3 of my drawing. These spaced units, consisting of a pair of rollers 31 which are preferably formed from rubber, synthetic rubber, or the like, extend throughout the length of chain 24, uninterruptedly, to form an endless ground-engaging tread, whose guide tracks are the metal surface 11 for the upper flight of travel, and the inflated tubes 19 for the lower flight travel of the tread.

The tubes, as stated, are inflatable to any desired pressures. To permit such inflation, valves having stems 32 of conventional nature extend upward from the tubes 19 and are accessible in recesses 33 formed in opposite side walls of frame or support 10, see Fig. 3.

When the power is applied to shaft 15, sprocket 14 is rotated and the tread unit 12 operated to advance the tractor (not shown) of which it forms a part. When the pairs of rollers 31, travelling in the lower flight, encounter obstacles, they will be elevated against the cushioning effect of the inflated tubes 19, as indicated by the obstacle B, Fig. 1. Thus, the travel of the tractor, or other vehicle to which the assembly forms a part, will travel more evenly over rough terrain. Moreover, by virtue of this cushioning action and the provision of the series of pairs of rubber, or the like, rollers 31, greater traction will be had in deep mud and under other adverse road or other terrain conditions.

Obviously, the invention is not limited to the embodiments herein shown and described, but may assume other forms.

I claim:

1. An endless tread and track assembly for a tractor having, in combination, a track-supporting frame, an endless chain carrying a series of pairs of closely spaced non-metallic rollers, sprockets rotatably carried by the frame over which said chain travels, at least one of said sprockets being driven, the lower portion of said frame having a pair of closely spaced parallel longitudinal inflatable elastic tubes with which said rollers contact during their travel, means for inflating said elastic tubes, and metal anchoring means attached to the opposite ends of the inflatable elastic tubes to engage with and anchor them to the track-supporting frame.

2. An endless tread and track assembly for a tractor having, in combination, a track-supporting frame, an endless chain carrying a plurality of pairs of closely spaced elastic rollers, spaced sprockets rotatably mounted in the frame adjacent its opposite ends at least one thereof being driven, the lower portion of said frame carrying a pair of closely spaced parallel longitudinal inflatable elastic tubes with which said rollers contact during their travel, air valve means attached to the tubes whereby they may be inflated to varying degrees of pressure, at least one of said sprockets being adjustable relative to and lengthwise of said frame, and metal anchoring members having portions thereof embedded in the opposite ends of the inflatable elastic tubes to hold the same in position with relation to the track-supporting frame.

3. An endless tread and track assembly for a tractor having, in combination, a track-supporting frame, spaced sprockets journalled in said frame, an endless chain in mesh with said sprockets and driven thereby, transverse shafts carried by said chain and extending outwardly at opposite sides thereof, a series of pairs of closely spaced non-metallic rollers mounted on said shafts on opposite sides of said chain, the under surface of said frame having a pair of closely spaced concave depression extending longitudinally thereof, a pair of closely spaced longitudinal inflatable elastic tubes disposed in said depressions and anchored at opposite ends in said frame and with which the rollers contact during travel of said endless tread, and air valve means connected to the tubes for inflation of the same.

References Cited in the file of this patent

UNITED STATES PATENTS

| | | |
|---|---|---|
| 784,792 | Hutton | Mar. 14, 1905 |
| 2,306,577 | Walker | Dec. 29, 1942 |
| 2,364,857 | Law | Dec. 12, 1944 |
| 2,652,289 | Bekker | Sept. 5, 1953 |
| 2,652,290 | Bekker | Sept. 15, 1953 |
| 2,661,251 | Bonmartini | Dec. 1, 1953 |
| 2,714,011 | Albee | July 26, 1955 |
| 2,734,476 | Marsh | Feb. 14, 1956 |